No. 887,843.  
PATENTED MAY 19, 1908.

W. Z. PIERCE.  
ANIMAL TRAP.  
APPLICATION FILED AUG. 19, 1907.

WITNESSES:  
L. Hern

INVENTOR  
William Z. Pierce  
BY John M. Spellman  
ATTORNEY

UNITED STATES PATENT OFFICE.

WILLIAM Z. PIERCE, OF DEXTER, TEXAS.

ANIMAL-TRAP.

No. 887,843.     Specification of Letters Patent.     Patented May 19, 1908.

Application filed August 19, 1907. Serial No. 389,100.

*To all whom it may concern:*

Be it known that I, WILLIAM Z. PIERCE, a citizen of the United States, residing at Dexter, in the county of Cooke and State of Texas, have invented certain new and useful Improvements in Animal-Traps, of which the following is a specification.

My invention relates to new and useful improvements in animal traps, and more particularly to traps for catching rodents.

The object of the invention is to provide a trap comprising a receptacle partially filled with a liquid, and provided with a peculiarly constructed and arranged cover. One of the essential features being that this cover makes a complete revolution when the animal springs upon the same.

Another feature resides in an approach or support placed a slight distance from the trap, so that the animal is compelled to jump therefrom onto the revolving cover thus cutting off his release.

Finally, the object of the invention is to provide a device of the character described that will be strong, durable, efficient and simple, and comparatively inexpensive to make, and one in which the several parts will not be liable to get out of working order.

Figure 1:
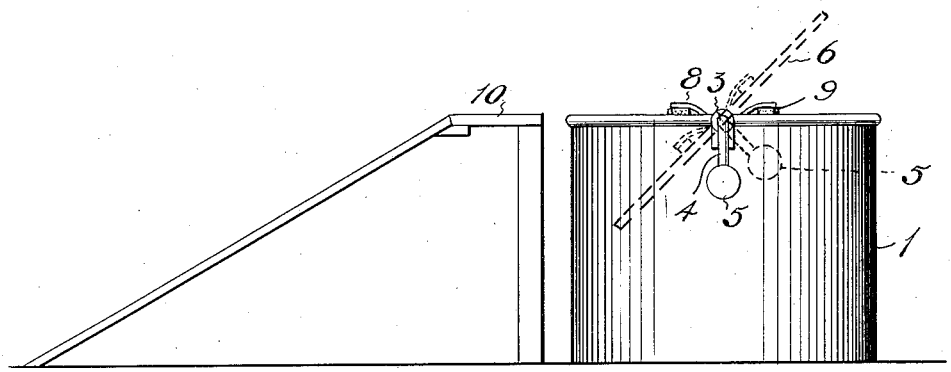
Figure 2:
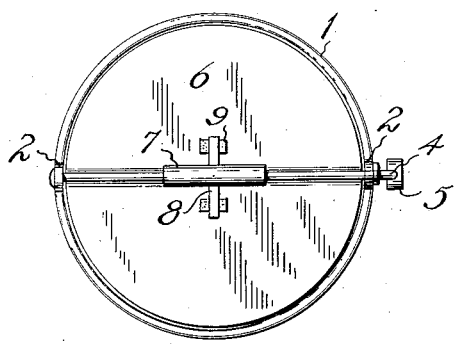
Figure 3:
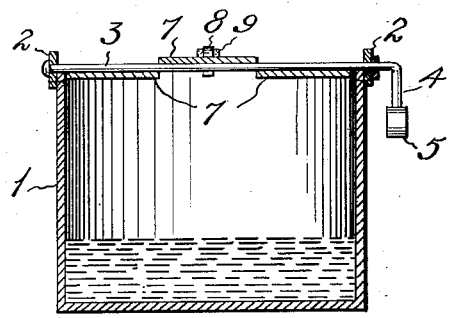

With the above and other objects in view, the invention has particular relation to certain novel features, an example of which is described in the specifications and illustrated in the accompanying drawings, wherein:

Figure 1 is a side elevation of the trap and the approach thereto, Fig. 2 is a plan view of the trap, and Fig. 3 is a transverse vertical sectional view.

In the drawings, the numeral 1 designates a suitable metallic receptacle which is preferably cylindrical in form, although its exact shape may be varied. However, the walls should be vertical without taper or incline. At diametrically opposite sides of the top of the receptacle, ears 2 projecting slightly above the same, are provided. These ears pivotally support a horizontal shaft or rod 3 having its end 4 turned down on the outside of the receptacle and carrying a suitable weight 5. This shaft supports a flat circular cover 6 fitting snugly within the receptacle, and provided with staggered upset portions 7 which form a series of sockets for the reception of the shaft.

A strip of spring metal 8 is passed through one of these upset portions and about the shaft at the central portion of the cover, as shown in Figs. 2 and 3. Beneath the free ends of this strip, which forms a bait holder, suitable bait 9 is placed, the resilient nature of the spring metal causing the same to retain the bait against displacement.

The upper surface of the cover lies substantially flush with the top edge of the receptacle, and is held in this horizontal position by the weight 5. The weight is comparatively light, while the cover and receptacle are of fairly large diameter, so that the slightest weight placed on the cover will force the same downward, thereby making the trap extremely sensitive. A suitable inclined approach or other support 10 is placed a short distance from the trap, and at right angles to the shaft, the space between being sufficient to prevent the animal from crawling or stepping from the support to the cover. The result of this arrangement and construction is that the animal is compelled to jump from the support to the cover in his endeavor to secure the bait. When the animal jumps from the support to the cover and naturally alighting near the edge of the same, the weight of his body, combined with its impact against the cover, revolves the same downward precipitating him into the receptacle in which he is either drowned or imprisoned. The cover completely revolves, the momentum gained being sufficient to carry it past its center and the weight 5 acting to complete the revolution. Should the cover merely swing downward under the weight of the animal, there might be some chance for him to crawl back or otherwise escape, or his body might wedge between the edge of the cover and the receptacle, subsequently permitting his escape. However, where the cover completely revolves and the animal is compelled to jump upon the same, this can not happen.

Too much stress can not be placed upon the approach 10 and the positioning of the same. Approaches to traps of this character have been used, but they have always been set against the trap with the result that the animal crawls up and placing his fore feet upon the cover and finding same swinging from under him, springs back and will not again approach the trap. By arranging the approach 10 some distance from the body of the trap, the animal must jump onto the cover and can not possibly get back to the approach as the cover swings down immediately. The distance between the upper edge of the approach and the trap should be sufficient to prevent the animal from crawling across. This arrangement has proven a success and has added greatly to the perfection of this class of traps.

What I claim, is:

In an animal trap, a receptacle, a flat rotatable cover fitting within the receptacle, ears provided on the receptacle, a shaft passing through the ears and supporting the cover, said shaft having a down turned end, a weight secured on the extreme lower end of said down turned end, and a spring bait holder on said cover held in place by said shaft.

In testimony whereof I have signed my name to this specification in the presence of two subscribing witnesses.

WILLIAM Z. PIERCE.

Witnesses:
 GEO. P. BARCLAY,
 J. A. TIFFS.